April 24, 1951     J. G. REID, JR     2,550,429
REFRIGERATION SYSTEM WITH EVAPORATOR REFRIGERANT CONTROL
Filed Jan. 2, 1947
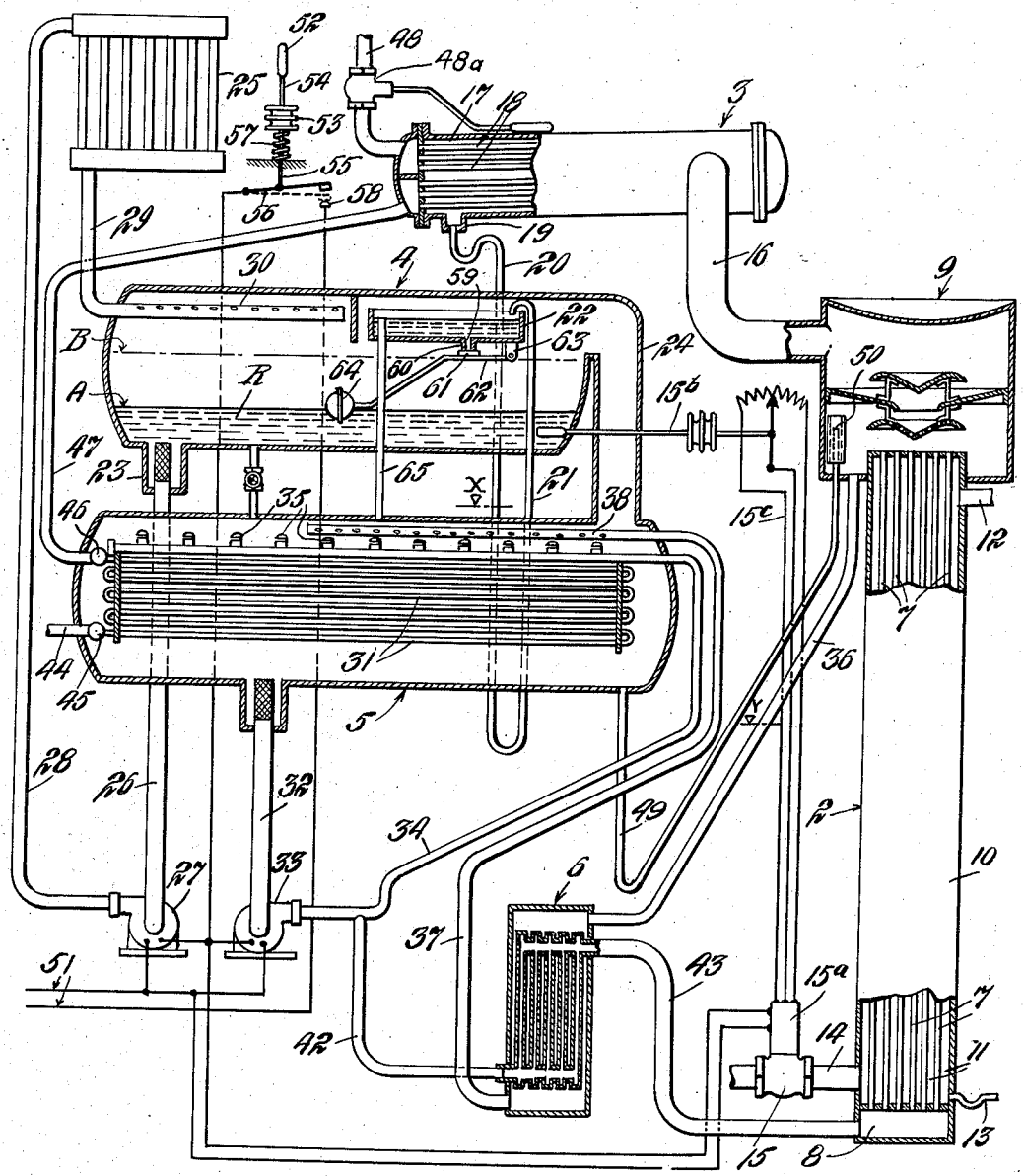
INVENTOR.
BY John G. Reid Jr.
Oliver S. Titcomb
his ATTORNEY Patented Apr. 24, 1951

2,550,429

UNITED STATES PATENT OFFICE 2,550,429

REFRIGERATION SYSTEM WITH EVAPORATOR REFRIGERANT CONTROL

John G. Reid, Jr., Evansville, Ind., assignor to Servel, Inc., New York, N. Y., a corporation of Delaware Application January 2, 1947, Serial No. 719,872

8 Claims. (Cl. 62—5)

The present invention relates to an absorption refrigeration system and more particularly to a construction and arrangement of elements in the evaporator of such a system.

The invention is particularly adapted for use with an absorption refrigeration system of the type in which a body of chilled refrigerant in the evaporator is periodically circulated through a cooling element located above and at some distance away from the evaporator. In such a system liquid refrigerant is apt to accumulate in the evaporator and progressively increase the concentration of the absorption solution which may interfere with the proper operation of the system. An overflow conduit can be provided between the evaporator and absorber for limiting the accumulation of refrigerant out of solution, but liquid refrigerant draining back from the cooling element between periods of operation will then overflow into the absorber. Such an overflow of liquid refrigerant represents a heat loss in the system and will flood the absorber and thereby reduce the absorption surface and the refrigerating capacity of the system.

One of the objects of the present invention is to provide a novel construction and arrangement of elements for limiting the amount of refrigerant out of solution to maintain the concentration of the solution within permissible limits.

Another object is to provide apparatus in an absorption refrigeration system for preventing an excessive accumulation of refrigerant in the evaporator during operation of the system or the overflow of refrigerant from the evaporator between periods of operation.

Another object is to provide an absorption refrigeration system having an evaporator so constructed and arranged as to limit the accumulation of liquid refrigerant therein during operation of the system and to store refrigerant draining from the cooling element between periods of operation.

Another object of the invention is to provide an evaporator of the type indicated adapted to contain a body of refrigerant and having mechanism therein for supplying refrigerant to the body of refrigerant at a rate equal to the rate of evaporation and delivering surplus refrigerant back into solution.

Still another object of the invention is to provide an evaporator of the type indicated having a refrigerant receiving vessel therein with a float operated valve for regulating the flow of refrigerant from the vessel to maintaian a body of refrigerant at a predetermined level in the evaporator and an overflow pipe connecting the vessel and absorber for delivering surplus refrigerant back into solution.

These and other objects will become more apparent from the following description and drawing. It is to be expressly understood, however, that the drawing is for the purpose of illustration only and not a definition of the limits of the invention, reference being had for this purpose to the appended claims. In the drawing:

The figure is a diagrammatic view of an absorption refrigeration system incorporating the refrigerant control apparatus of the present invention.

The absorption refrigeration system shown in the drawing is of the type illustrated and described in detail in the application for United States Letters Patent of Albert R. Thomas, Serial No. 560,214, filed October 25, 1944, and entitled Refrigeration. This application matured into Patent No. 2,518,202 on August 8, 1950. Such a system operates in a partial vacuum and utilizes water as a refrigerant and a hygroscopic salt solution, such as lithium chloride, lithium bromide, or the like, as an absorbent. The system comprises a generator 2, a condenser 3, an evaporator 4, an absorber 5 and a heat exchanger 6 interconnected to provide paths of flow for the circulation of the refrigerant and absorbent. The generator 2 comprises a plurality of upright tubes 7 connected at lower end of an inlet chamber 8 and at their upper ends to a separating chamber 9. Surrounding the tubes 7 is a jacket 10 providing a heating chamber 11 therebetween. The heating chamber 11 is vented to the atmosphere by a vent pipe 12 and provided with a condensate return pipe 13 adjacent its lower end.

A heating medium such as steam is supplied to the heating chamber 11 through a supply pipe 14 as controlled by a regulating valve 15. The regulating valve 15 is preferably of the modulating type and may be actuated by any suitable control system. As illustrated in the drawing the valve 15 is actuated in response to variations in the temperature of the refrigerant in the evaporator as illustrated and described in detail in my prior application Serial No. 586,731 filed April 5, 1945 and entitled Refrigeration. This application matured into Patent No. 2,502,104 on March 28, 1950. The control is illustrated diagrammatically as comprising an electric motor 15a adapted to automatcally regulate the valve 15 when energized and close the valve when deenergized. A thermal sensitive control element 15b responsive to the temperature of a body of liquid refrigerant R in the evaporator 4 varies an electric resistance in a balanced circuit 15c to operate the motor 15a and regulate the valve 15 in increments proportional to changes in the resistance and refrigerant temperature. Heat is transmitted from steam in the chamber 11 to solution in the tubes 7 to expel refrigerant vapor therefrom which rises and lifts solution into the separating chamber by vapor lift action.

The separating chamber 9 of the generator 2 is connected to the condenser 3 by a vapor pipe 16. The condenser may be of any suitable type and, as illustrated, is a conventional surface condenser having a chamber 17 with tubes 18 extending longitudinally through the chamber. The tubes 18 are connected at their opposite ends to suitable headers to adapt a cooling medium to flow therethrough to cool and condense refrigerant vapor in the chamber 17.

Refrigerant condensate in the condenser 3 flows by gravity from a sump 19 through a U-shaped tube 20 to the evaporator 4. The up-leg 21 of the U-shaped pipe 20 extends through the bottom of the evaporator 4 and empties into a vessel 22 in the evaporator. Liquid refrigerant is delivered from the vessel 22 to maintain a body of liquid refrigerant R at a predetermined level A in the evaporator 4 as later to be described in detail.

While the evaporator may have other forms, as herein illustrated, it comprises a horizontally arranged cylindrical tank having a sump 23 at the bottom and a vapor duct 24 adjacent the top. The body of chilled refrigerant R in the evaporator 4 is circulated through a cooling element 25 located remotely from and above the evaporator in an auxiliary loop circuit connected to the evaporator. The auxiliary loop circuit comprises a conduit 26 connected to the sump 23 in the evaporator, circulating pump 27, conduit 28, cooling element 25 and a conduit 29 having a perforated end portion 30 extending into and longitudinally of the evaporator adjacent the top thereof for delivering the refrigerant in a spray to promote evaporation. The evaporator 4 is made sufficiently large so as to have a liquid capacity between the levels A and B to store all of the refrigerant which may drain back into the evaporator from the cooling element 25.

The absorber 5 is also in the form of a horizontally arranged cylindrical tank positioned below the evaporator 4. The absorber 5 has a bank of cooling coils 31 mounted therein and the vapor duct 24 from the evaporator 4 is connected to the top of the absorber adjacent one end for delivering refrigerant vapor onto the bank of cooling coils. An auxiliary loop circuit is connected to the absorber 5 for recirculating absorption solution therein comprising a conduit 32, circulating pump 33 and conduit 34 having an end portion extending longitudinally of the absorber adjacent the top thereof and provided with spray nozzles 35.

Absorption solution weak in refrigerant or, in other words, a concentrated salt solution flows by gravity from the separating chamber 9 at the top of the generator 2 to the top of the absorber 4 in a path of flow including the conduit 36, liquid heat exchanger 6 and a conduit 37 having a perforated end section 38 constituting a spray pipe extending into the absorber adjacent the top thereof. A portion of the absorption solution strong in refrigerant or, in other words, dilute salt solution in the absorber 5 is delivered to the inlet chamber 8 of the generator 2 in a path of flow including a conduit 42 connected to the conduit 34 of the auxiliary loop circuit, heat exchanger 6 and conduit 43.

The generator 2 and condenser 3 operate at a pressure corresponding to the vapor pressure of the refrigerant in the condenser and the evaporator 4 and absorber 5 operate at a lower pressure corresponding to the vapor pressure of the refrigerant in the evaporator. The difference in pressures in the condenser 3 and evaporator 4 is maintained by a liquid column in the U-shaped tube 20 and the difference in pressure between the generator 2 and absorber 5 is maintained by liquid column in the conduit 37. The liquid level in the U-shaped tube 20 is indicated by the reference character X and the liquid level in the conduit 36 connected to the conduit 37 through the heat exchanger 6 is indicated by the reference character Y. The difference in pressures in the generator 2 and the absorber 5 also is maintained by the circulating pump 33.

A cooling medium such as water is supplied to the bank of cooling coils 31 in the absorber 5 and the tubes 18 of the condenser 3 from a conduit 44 connected to any suitable source, such as a city water main, cooling tower, or the like. Conduit 44 is connected to a header 45 which, in turn, is connected to the individual coils of the bank of coils 31 in the absorber. A conduit 47 connects a header 46 at the opposite ends of the coils 31 to the condenser 3. A discharge pipe 48 is connected to the outlet from the condenser 3 and the flow of cooling water may be controlled by any suitable means such as the thermostatic valve 48a illustrated.

An overflow conduit 49 also is provided between the separating chamber 9 of the generator 2 and the bottom of the absorber 5, the conduit being of U-shaped form for maintaining a liquid column to balance the difference in pressures and having an end 50 extending above the normal liquid level in the separating chamber.

The motors for the circulating pumps 27 and 33 and the control circuit 15c for the modulating valve 15 are connected to a source of electric current 51 for simultaneous energization and de-energization as controlled by a thermostatically operated switch responsive to a temperature effected by the cooling element 25. The thermostatically operated switch comprises a thermal responsive bulb 52 subjected to the temperature of the medium to be cooled by the cooling element 25 and an expansible bellows 53 connected to the bulb 52 by capillary tube 54. The end of the bellows 53 is suitably connected, as by a link 55, to a movable switch arm 56 and a spring 57 surrounds the link and opposes expansion of the bellows 53. Switch arm 56 cooperates with a fixed contact 58 to close the circuit upon an increase in the ambient temperature and spring 57 operates the switch arm to open the circuit upon a decrease in temperature. Upon closure of the thermostatic switch the pumps 27 and 33 are operated and the control circuit 15c is energized to open the steam regulating valve as controlled by the temperature responsive element 15b. Opening the thermostatic switch stops operation of the pumps 27 and 33 and closes the valve 15.

In accordance with the present invention the evaporator 4 is so constructed and arranged as to limit the accumulation of refrigerant therein during operation of the system and to store refrigerant draining back from the cooling element 25 in the auxiliary circuit between periods of operation. The vessel 22 is mounted in the evaporator 4 adjacent the top thereof and arranged to receive liquid refrigerant delivered from the condenser 3 as previously explained. The vessel 22 has an outlet or drain opening 59 in the bottom with a valve seat 60 surrounding the opening. A valve 61 operated in response to variations in the liquid level in the evaporator 4 cooperates with the valve seat 60 to open or close the opening 59. As illustrated in the drawing, the valve 61 is mounted on an arm 62 pivotally connected at one end to a bracket 63 depending from the vessel 62 and having a float 64 at its opposite end. An overflow pipe 65 extends from the top of the absorber 5 upwardly into the evaporator 4 and through bottom of the vessel 22 and projects a predetermined distance above the bottom of the vessel.

The arm 62 is so arranged as to engage the valve 61 with the valve seat 60 to close the drain opening 59 when the body of refrigerant R in the evaporator 4 is at or above the level indicated by the reference character A. When the body of refrigerant R has a liquid level below A, the float 64 and arm 62 are lowered and move the valve 61 away from the valve seat 60 to uncover the drain opening 59 and permit liquid refrigerant to flow from the vessel 22 into the body of refrigerant R. In this way the valve 61 permits only a predetermined maximum amount of refrigerant to accumulate in the evaporator 4 during operation of the system corresponding to the amount in the body of refrigerant R below the level A and the amount in the auxiliary circuit and cooling element 25. The vessel 22 and valve 61, however, will operate to add an amount of refrigerant to the body of refrigerant R equal to that evaporated in the evaporator 4. If for any reason a surplus amount of refrigerant is delivered to the vessel 22 it will overflow through the pipe 65 into the solution in the absorber 5. Thus, the amount of refrigerant out of solution is limited to a predetermined maximum amount and the concentration of the absorption solution in the generator 2 is maintained within permissible limits.

As the body of refrigerant R is maintained at or below the level A in the evaporator 4, refrigerant may drain back from the cooling element 25 and accumulate in the evaporator between the levels A and B without overflow into the absorber 5. Thus, between periods of operation a body of refrigerant R at the liquid level B will be stored in the evaporator 4 which is available for circulation in the auxiliary circuit at the beginning of the next period of operation. One form of the invention having now been described in detail the mode of operation is explained as follows.

For purposes of description let it be assumed that the electrical circuit for the circulation pumps 27 and 33 is open, the steam control valve 15 is closed and the body of refrigerant R in the evaporator 4 is at the level B. As the temperature of the medium to be cooled increases the thermostatically operated switch 56, 58 will close and initiate operation of the circulating pumps 27 and 33. The regulating circuit 15c will be energized simultaneously with the operation of the pumps 27 and 33 and operate the modulating valve 15 to supply steam to the heating chamber 11 of the generator 2 at a rate corresponding to the temperature of the refrigerant.

The body of the refrigerant R in the evaporator 4 is circulated by the pump 27 through the cooling element 25 in a path of flow including the conduit 26, circulating pump 27, conduit 28, cooling element, conduit 29 and perforated spray pipe 30 which delivers the refrigerant into the evaporator in the form of a spray. Simultaneously absorption solution in the absorber 5 is circulated in the auxiliary circuit comprising the conduit 32, circulating pump 33, conduit 34 and nozzles 35. The absorption solution delivered from the nozzles 35 trickles over the bank of cooling coils 31 and absorbs the refrigerant vapor flowing from the evaporator 4 through the vapor conduit 24 to produce a low vapor pressure and evaporating temperature in the evaporator. When the refrigerant is delivered from the spray pipe 30 into the evaporator 4 at low pressure a portion of the refrigerant is evaporated at low temperature which converts its sensible heat to latent heat of vaporization and reduces the temperature of the unevaporated liquid refrigerant returned to the body of refrigerant R. The circulation of chilled refrigerant through the cooling element 25 cools the ambient and the heat transferred to the refrigerant is converted to latent heat of vaporization by evaporating more refrigerant in the evaporator at low temperature.

The heat of the steam supplied to the heating chamber 11 of the generator 2 is transmitted through the tubes 7 to heat the solution therein and expel refrigerant vapor therefrom. The expelled refrigerant vapor rises in the tubes 7 and lifts the absorption solution by vapor lift action. The refrigerant vapor flows from the separating chamber 9 through the conduit 16 into the condenser 3 where the refrigerant vapor is liquefied by the transfer of its heat of vaporization to the cooling water in the tubes 17. The condensed refrigerant flows from the sump 19 of the condenser 3 through the U-shaped tube 19 and into the vessel 22 in the evaporator 4. A portion of the refrigerant having been evaporated in the evaporator 4 and absorbed in the absorber 5, the body of refrigerant R will be below the level A and the valve 61 will uncover the drain opening 59 so that the refrigerant will flow from the vessel 22 into the body of refrigerant R in the evaporator.

Simultaneously, the absorption solution weak in refrigerant will flow from the separating chamber 9 to the absorber 5 in a path of flow including the conduit 36, heat exchanger 6, conduit 37 and spray pipe 38, the absorption solution being delivered to the absorber in a spray to promote absorption and thereafter trickles down over the extended surfaces of the cooling coils 31 therein. The relatively concentrated absorption solution delivered from the generator 2 to the absorber 5 increases the rate of absorption and reduces the vapor pressure and temperature of the refrigerant in the evaporator 4. A part of the absorption solution recirculated in the absorber 5 is delivered to the inlet chamber 8 at the base of the generator in a path of flow including the conduit 42, heat exchanger 6 and conduit 43.

The rate of operation of the system is regulated by the modulating valve 15 in accordance with the temperature of the body of refrigerant R. As the temperature of the body of refrigerant R increases or decreases in accordance with the rate of evaporation, the amount of refrigerant delivered to the evaporator 4 will correspond approximately to the rate of evaporation. If for any reason liquid refrigerant is delivered from the condenser 3 to the vessel 22 at a faster rate than it is being evaporated in the evaporator 4, the level of the body of refrigerant R in the evaporator 4 will rise and operating through the float 64 and arm 62 will engage the valve 61 with the valve seat 60 to close the drain opening 59. A small amount of liquid refrigerant will then accumulate in the vessel 22 until it reaches the level at the upper end of the pipe 65 and overflow into the absorber 5. Thus, only a predetermined maximum amount of refrigerant can accumulate in the evaporator 4 and out of solution in the system whereby to maintain the concentration of the absorption solution within permissible limits.

The circulating pumps 27 and 33 continue to operate until the temperature effected by cooling element 25 is lowered sufficiently to cause the thermostatic switch 56, 58 to open the circuit and stop the circulating pumps 27 and 33. Simultaneously the regulating circuit 15c is deenergized and the motor 15a operates automatically to close the valve 15 to shut off the supply of steam to the generator 2. As the cooling element 25 is located above the evaporator 4 the liquid refrigerant therein will drain back through the conduit 29 and spray pipe 30 into the evaporator 4. Due to the float operated valve 61, the body of refrigerant R is maintained below the level A during operation of circulating pump 27 so that the evaporator 4 has sufficient capacity between the levels A and B to receive all of the refrigerant draining back from the cooling element 25 without any overflow into the absorber. Thus, the refrigerant R draining back into the evaporator 4 is stored between periods of operation and is available at the beginning of the next period of operation to fill the auxiliary circuit and cooling element 25 and provide a sufficient body of refrigerant to continuously circulate the same in the auxiliary circuit.

It will now be observed that the present invention provides a novel construction and arrangement of elements in an absorption refrigeration system for preventing an excessive accumulation of refrigerant in the evaporator during periods of operation or the overflow of refrigerant from the evaporator between periods of operation. It will still further be observed that the present invention provides an arrangement for periodically circulating chilled refrigerant from an evaporator to a remote cooling element without loss of refrigerant or flooding the absorber between periods of operation and without the use of check valves in the cooling element or cushioning means to prevent water hammer.

While a single embodiment of the invention is herein illustrated and described, it is to be understood that modifications may be made in the structure and arrangement of the elements without departing from the spirit or scope of the invention. For example, other controls than those herein illustrated may be used for initiating operation of the circulating pumps and for regulating the supply of heating steam to the generator. Therefore, without limiting myself in this respect the invention is defined by the following claims.

I claim:

1. An absorption refrigeration system having a plurality of interconnected elements including an evaporator containing a body of refrigerant, a cooling element remote from the evaporator, an auxiliary circuit connecting the evaporator and cooling element for circulating refrigerant through the cooling element, a heat operated generator in said system for expelling refrigerant from absorption solution and connected to deliver additional refrigerant to the body of refrigerant in the evaporator, and control mechanism operated in response to variations in the liquid level of the refrigerant in the evaporator for regulating the amount of additional refrigerant delivered to the evaporator whereby to limit the amount of refrigerant out of solution in the system.

2. An absorption refrigeration system having a plurality of interconnected elements to provide a solution circuit and a refrigerant circuit including an evaporator containing a body of liquid refrigerant therein, a cooling element remote from the evaporator, an auxiliary circuit connecting the evaporator and cooling element for circulating refrigerant through the cooling element, a heat operated generator in the solution circuit for expelling refrigerant from absorption solution and connected to supply additional refrigerant to the evaporator, and a float operated device in the evaporator for regulating the amount of additional refrigerant supplied to the body of refrigerant to maintain it below a predetermined level and delivering surplus refrigerant to the solution circuit whereby to limit the amount of refrigerant out of solution.

3. An absorption refrigeration system having a plurality of interconnected elements including an evaporator, a cooling element positioned at a level above the evaporator, an auxiliary circuit connecting the evaporator and cooling element, a pump in the auxiliary circuit for circulating liquid refrigerant through the cooling element, a thermostat responsive to a temperature affected by the cooling element for initiating and stopping operation of the pump, said system operating to deliver additional refrigerant to the evaporator, mechanism controlled by the liquid level in the evaporator for regulating the amount of refrigerant delivered to the evaporator to maintain a body of liquid refrigerant below a predetermined level therein when the pump is in operation, and said evaporator having sufficient capacity above the liquid level to store all of the refrigerant draining back from the cooling element between periods of operation of the pump.

4. An absorption refrigeration system having a plurality of interconnected elements including an evaporator containing a body of refrigerant therein, a cooling element located at a level above the evaporator, an auxiliary circuit connecting the evaporator and cooling element, a pump in the auxiliary circuit, a thermostat responsive to a temperature affected by the cooling element for initiating operation of the pump to circulate liquid refrigerant from the evaporator through the cooling element, part of said circulating refrigerant being evaporated in the evaporator, said system operating to deliver additional refrigerant to the evaporator, control mechanism for regulating the delivery of additional refrigerant to the evaporator to supply an amount equal to the refrigerant evaporated, and said evaporator having sufficient capacity to store all of the refrigerant draining from the cooling element.

5. A refrigeration system having a plurality of interconnected elements including an evaporator adapted to contain a body of refrigerant therein, said system operating to deliver additional refrigerant to the evaporator, a vessel in the evaporator connected to receive liquid refrigerant delivered from the system and maintain the delivered refrigerant separate from the body of refrigerant in the evaporator, a valve controlled by the level of the body of liquid in the evaporator for regulating the flow of liquid refrigerant from the vessel to the body of refrigerant in the evaporator, and an overflow pipe connected to the vessel.

6. An absorption refrigeration system having a generator, a condenser, an evaporator, an absorber, conduits interconnecting the elements to provide paths of flow for refrigerant and absorbent, a cooling element remote from and located above the evaporator, an auxiliary circuit for circulating liquid refrigerant from the evaporator through the cooling element, a vessel in the evaporator connected to receive refrigerant from the condenser, a float operated valve for regulating the flow of refrigerant from the vessel to the evaporator to maintain a body of refrigerant below a predetermined level therein, an overflow conduit connecting the vessel to the absorber, and said evaporator having sufficient capacity above the predetermined level to receive and store all of the refrigerant draining back from the cooling element.

7. An absorption refrigeration system having a generator, a condenser, an evaporator, an absorber, conduits interconnecting the elements to provide paths of flow for refrigerant and absorbent, a cooling element remote from and located above the evaporator, an auxiliary circuit connecting the evaporator and cooling element and having a spray pipe in the evaporator, a pump in the auxiliary circuit for circulating liquid refrigerant from the evaporator through the cooling element and delivering the refrigerant back to the evaporator through the spray pipe, a vessel in the evaporator connected to receive refrigerant from the condenser, a float operated valve for regulating the flow of refrigerant from the vessel to maintain a body of refrigerant in the evaporator below a predetermined level therein, an overflow pipe connecting the vessel and absorber, control mechanism for operating the pump periodically, and said evaporator having sufficient capacity above the liquid level to receive and store all of the refrigerant draining back from the cooling element between periods of operation of the pump.

8. A vacuum type absorption refrigeration system having a generator, a condenser, an evaporator, an absorber, conduits interconnecting the elements to provide circuits for refrigerant and absorbent, said evaporator containing a body of liquid refrigerant therein, a cooling element separate from the evaporator, an auxiliary circuit connecting the evaporator and cooling element for circulating refrigerant through the cooling element, means for heating the generator to deliver additional refrigerant to the evaporator, control means for regulating the amount of additional refrigerant delivered for maintaining the body of refrigerant below a predetermined level in the evaporator to limit the amount of refrigerant out of solution, and said evaporator having sufficient capacity above the predetermined level to store all of the liquid refrigerant in the auxiliary circuit.

JOHN G. REID, Jr.

REFERENCES CITED

The following references are of record in the file of this patent:

UNITED STATES PATENTS

| Number | Name | Date |
|---|---|---|
| 1,718,312 | Shipley | June 25, 1929 |
| 2,140,462 | Stratford | Dec. 13, 1938 |
| 2,277,429 | Fiene | Mar. 24, 1942 |
| 2,298,924 | Bichowsky | Oct. 13, 1942 |
| 2,304,413 | Kleucker | Dec. 8, 1942 |
| 2,356,638 | Williams | Aug. 22, 1944 |